Aug. 2, 1955        L. F. DEDDA        2,714,304
LUMINESCENT KEY
Filed Sept. 12, 1952
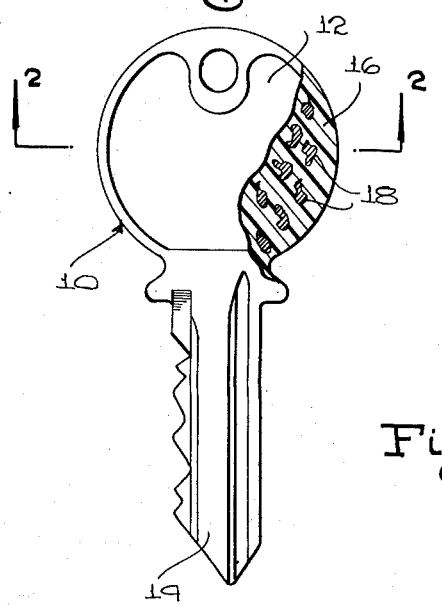
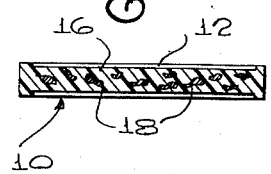
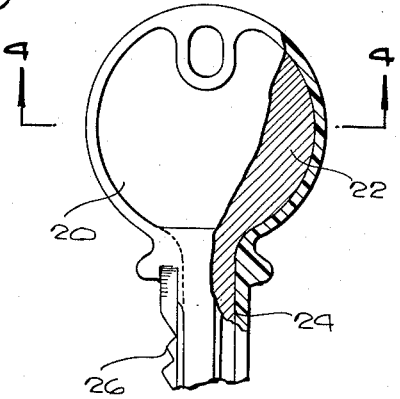
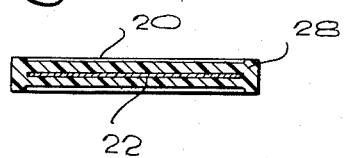
INVENTOR.
LUCA F. DEDDA
BY
McMorrow, Berman & Davidson
ATTORNEYS

United States Patent Office 2,714,304
Patented Aug. 2, 1955

2,714,304

LUMINESCENT KEY

Luca F. Dedda, Springdale, Conn.

Application September 12, 1952, Serial No. 309,338

1 Claim. (Cl. 70—406)

This invention relates to key construction, and more particularly, has reference to a key having a luminescent surface.

The main object of the present invention is to provide an improved key having luminous characteristics, for the purpose of facilitating use of the key in darkness.

Another object of importance is to provide a key as described, wherein said key will be provided with a luminous surface extending through the full areas of both the head and shank of the key, so as to further increase the adaptability of the key for use under conditions of darkness.

Still another object is to provide a key as stated which can be readily formed either wholly or in part from a thermoplastic material compounded with a luminous substance.

Another object is to provide a key which can be formed in any of a number of different colors, to correspond with similarly colored locks, or locks provided with colored identification means, thereby to facilitate selection of the proper key to be inserted in the lock.

Still another object is to provide a key as stated which, by reason of the pronounced thermoplastic content thereof, will be lighter than ordinary keys, and less bulky.

Still another object is to provide a key as described which can be provided with a metallic reinforcing core, said core being so shaped as to be usable without changing the outer configuration thereof in any of various keys, said core having molded thereabout a plastic substance compounded with a luminescent material.

Still another object is to provide a key construction which will have the desirable characteristics noted above and which will yet be capable of manufacture at a minimum of cost.

Other objects will appear from the following description, the claim appended thereto and from the annexed drawing, in which like reference characters designate like parts throughout the several views, and wherein:

Figure 1 is an elevational view of a key formed in accordance with the present invention;

Figure 2 is a transverse sectional view through the head of the key, taken on line 2—2 of Figure 1;

Figure 3 is a fragmentary elevational view of a modified form, portions being shown in section; and Figure 4 is a sectional view on line 4—4 of Figure 3.

Referring to the drawings in detail, in the form of the invention shown in Figures 1 and 2, the key 10 is formed of plastic material throughout, said material being molded to a desired shape to impart to the key the selected outer configuration thereof.

The key 10, as shown in Figure 1, includes a head 12 and a shank 14, said head and shank being integrally molded from thermoplastic material 16 or material of equivalent characteristics. The thermoplastic material 16 has compounded therewith luminescent material 18, said luminescent material being diffused throughout the entire key, so as to be exposed at opposite faces of the head, and at opposite faces of the shank. The luminous characteristics of the key extend through the full area of the head and shank, at both sides of the key, and thus it will be seen that one using a key formed in accordance with the present invention is enabled to use the same in darkness, without the difficulties which have heretofore been experienced, when one attempts to insert a key in a keyhole under conditions of darkness.

In Figure 3 there has been illustrated a modified construction, wherein the head 20 has embedded therein the head portion 22 of a metallic core 24. The core 24 is formed as a flat, thin blank of material, one end of the blank being widened to provide the head portion 22, the other end of said blank being of relatively elongated formation, to reinforce the shank 26 of the key.

The core 24 is utilized as an intermediate lamination in the key, extending through the full length of the key, and through substantially the full width of the key.

The core 24 is embedded in a molded body 28, the molded body 28 being of thermoplastic material or the like, and having luminescent material freely diffused therethrough. As will be noted, the luminescent, molded body 28 completely encloses the core 24, the edges of the body projecting beyond the several edges of the core 24, in the manner shown to particular advantage in Figure 3.

In both forms of the invention, the key has its entire outer surface formed of a luminescent, plastic material, thus to greatly facilitate the use of the key in the dark. Further, it will be noted that the material of which the key is formed is such as to render the key light, as distinguished from ordinary keys that are formed throughout of metal material. The lightness of the key is a considerable advantage thereof, since usually, a key will be carried with a number of other keys on a key ring, the keys assembled with said ring forming a substantial weight which cannot be conveniently carried.

Although it has been stated herein that thermoplastic material is preferred, with said material having luminous substances compounded therein, it may be that other plastic materials can be utilized for advantage, and except as necessarily limited by the claim, it is not proposed that the invention be restricted to the use of thermoplastic material.

It is also considered a part of the invention that the use of plastic material in manufacture of the key permits the making of keys of different colors. In this instance the locks in which the keys are to be inserted would be correspondingly colored, or would have a colored lock identification means, and thus, one is enabled to select instantaneously the particular key, among several which he may have, that is to be inserted in a particular lock.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

In a key, a flat, metallic core shaped to provide an inner lamination for both the shank and head of said key, and thermoplastic material molded about said core, to form the opposite faces of the head and shank respectively, said thermoplastic material being so shaped as to impart to the head and shank the key shape desired therefor, and being compounded with a luminescent material, said core lying wholly in a plane paralleling and extending midway between the planes of the opposite faces of said key, the core having a head portion about which is molded part of said material to form the head of the key, and having a shank portion about which is molded the remainder of the material to form the shank of the key, the head and shank portions of the core having their edges wholly covered by said material, said shank portion having its longitudinal edges spaced inwardly from the longitudinal edges of the molded thermoplastic covering of the shank portion, one longitudinal edge at least of the molded covering of the shank portion being notched to interfit with an associated lock.

References Cited in the file of this patent

UNITED STATES PATENTS

| | | |
|---|---|---|
| 2,105,304 | Wagner | Jan. 11, 1938 |
| 2,201,127 | Schechter | May 14, 1940 |
| 2,303,097 | Townsend | Nov. 24, 1942 |
| 2,341,403 | Williams | Feb. 8, 1944 |
| 2,349,745 | Morris | May 23, 1944 |

OTHER REFERENCES

Popular Science for July 1948, page 120.